United States Patent
Booth

4,178,101
Dec. 11, 1979

[54] SCALAR IRRADIANCE METER

[76] Inventor: Charles R. Booth, 4648 Milton St., San Diego, Calif. 92110

[21] Appl. No.: 778,028

[22] Filed: Mar. 16, 1977

[51] Int. Cl.$^2$ ............................ G01J 1/42; G02B 5/14
[52] U.S. Cl. .................................. 356/221; 356/225; 350/175 SL; 250/227
[58] Field of Search ............... 356/221, 225, 226, 218, 356/222; 350/175 SL, 96.26; 250/227

[56] References Cited
U.S. PATENT DOCUMENTS

| | | | |
|---|---|---|---|
| 3,145,249 | 8/1964 | Meltzer | 350/175 SL |
| 3,180,210 | 4/1965 | Tyler | 356/225 |
| 3,691,001 | 9/1972 | Takahashi et al. | 350/96.26 |

FOREIGN PATENT DOCUMENTS 1257359 12/1971 United Kingdom ............... 350/175 SL

OTHER PUBLICATIONS

W. S. Maddux, "A 4 π Light Meter" Limnology and Oceanography, vol. 2, pp. 136–137, 1966.
T. Sasaki et al. "A 4 π Underwater Irradiance Meter" Journal of the Oceanographical Society of Japan, vol. 22, No. 4, Aug. 1966, pp. 123–128.
R. I. Currie, "Scalar Irradiance as a Parameter" Radiant Energy in the Sea, International Assoc. of Physical Oceanography, pp. 107–122, 1960.
Rich & Wetzel, "A Simple Sensitive Underwater Photometer" Limnology and Oceanography, vol. 14, pp. 611–613, 1969.
Smith, R. C., Wilson Jr, W. H., "Photon Scalar Irradiance" Applied Optics, vol. 11, No. 4, Apr. 1972, pp. 934–938.

*Primary Examiner*—Rolf G. Hille
*Attorney, Agent, or Firm*—Bruno J. Verbeck

[57] ABSTRACT

An apparatus for measuring scalar irradiance or the incident flux of radiant energy from a 4π solid angle about a point. The present invention relates to an apparatus which comprises a solid spherical radiant energy collector, a radiant energy detector which converts radiant energy into electrical signal, a light conductor which transmits a portion of the radiant energy within the spherical collector to the detector, a means for conditioning the electrical signal such that the electrical signal responds to the intensity of the incident flux, and a means for displaying the conditioned signal. The apparatus further includes a spectral shaping assembly located intermediate the detector and the light conductor whereby the spectral characteristics of the radiant energy are adjusted to compensate for apparatus response in the desired spectral region.

11 Claims, 6 Drawing Figures

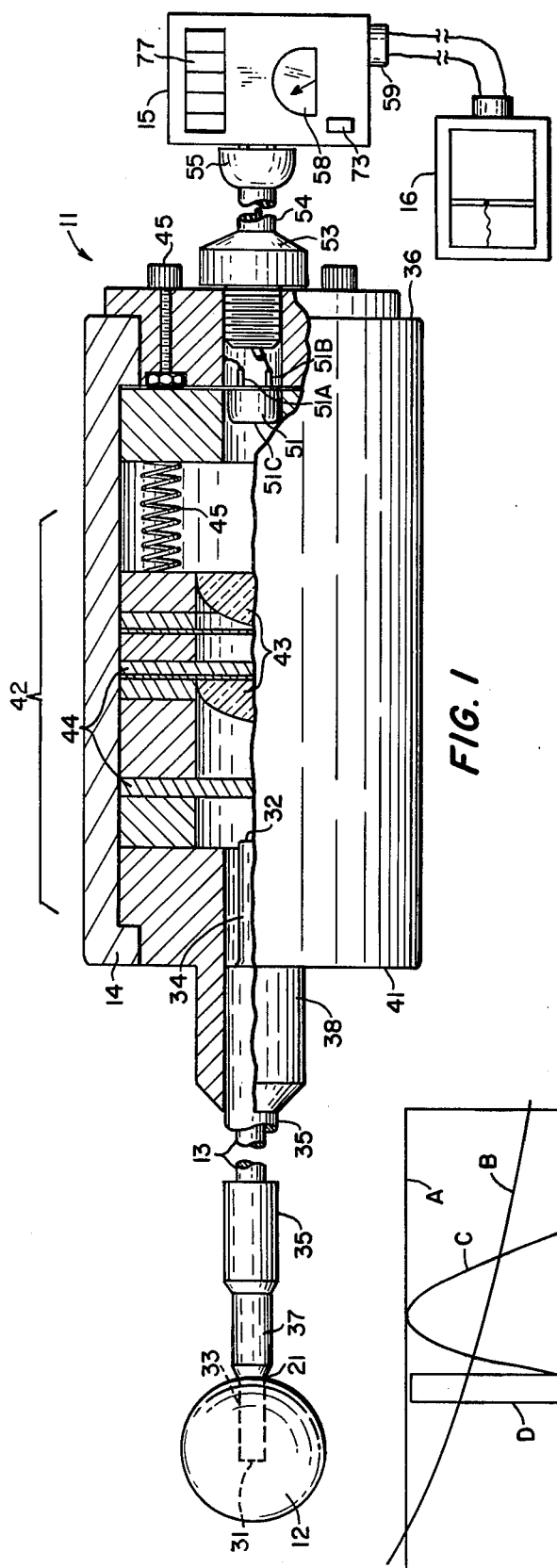

SCALAR IRRADIANCE METER

BACKGROUND OF THE INVENTION

1. Field of the Invention

This invention relates to a new and unique apparatus for measuring scalar irradiance with variations adapted to measure the incident flux of a continuous $4\pi$ or $2\pi$ solid angle in a laboratory or underwater environment.

Devices of this type detect and measure the intensity of radiant energy to establish the total radiation available for photosynthesis and for a variety of other related biological examinations. The device which provides such intensity measurements should be suitable for underwater operation, easy to manipulate, provide measurements in standardized physical units, be spherically responsive to a continuous $4\pi$ incident flux, and respond selectively to photosynthetically significant energy.

BRIEF DESCRIPTION OF THE PRIOR ART

A number of devices are available which measure radiant flux, however, these devices exhibit spectral and spatial response characteristics which are inconsistent with and irrelevant to present photosynthetic studies. Light measuring devices are characterized as being "photometric" or "radiometric". Photometric relates to the determination of the intensity of the light field by a device which exhibits a spectral or frequency response that is similar to that of the human eye. Radiometric relates to the determination of the intensity of the light field by a device that responds to physical parameters of the light such as the amount of energy within a given frequency range.

The article *Photon Scalar Irradiance,* Smith and Wilson, Applied Optics, Volume II, Page 934, April 1972, describes one form of a radiometric device which is designed to measure scalar irradiance. The Smith and Wilson device employs two opposed fish-eye lenses to focus hemispherical light onto a light detector. The Smith and Wilson device, however, demonstrates an appreciable reduction in sensitivity at the horizon of each hemisphere. Further, the Smith and Wilson device requires extensive optical components.

The article entitled *A $4\pi$ Light Meter,* Maddux, Limnology and Oceanography, Volume 2, pages 136–137, 1966, describes a device which imbeds a light detector into a plastic or styrofoam sphere. This device also prohibits the spectral and spacial characteristics of the incident light flux to be shaped, and it has reduced operating flexibility because of the juxtaposition of the styrofoam collecting sphere and the light detector.

Other devices propose the hemispherical collection of light with electronic detection but exhibit reduced sensitivity at the horizon and reduced flexibility for spectral shaping. For example, the device disclosed in *A Simple Sensitive Underwater Photometer,* Rich & Wetzel, Limnology and Oceanography, Volume 14, pages 611–613, 1969, is bulky and inappropriate for experimental laboratory work.

*Scalar Irradiance as a Parameter in Phyloplankton Photosynthesis and a Proposed Method for its Measurement,* Currie, Radiant Energy in the Sea, International Association of Physical Oceanography, pages 107–122, 1960, discloses a device with two hemispherical cosine type collectors which exhibit considerable reduced sensitivity at the horizon. Similarly, *A $4\pi$ Underwater Irradiance Meter,* Sasaki, Oshibico, and Kishino, Journal of the Oceanographical Society of Japan, Volume 27, No. 4, pages 123–128, August 1966, shows a device with hemispherical lense but with a cosine type detector which results in the reduced sensitivity at the horizon.

U.S. Pat. No. 3,180,210 describes still another example of a device to measure scalar irradiance using a hollow diffusing sphere with rotating mirrors and phototubes. This device is cumbersome, subject to depth limitation and generally impractical for laboratory work.

Further, none of these devices describe a device which incorporates electrical signal conditioning to enable a direct readout in light measurement units appropriate for instantaneous or integrated scale irradiance determination, nor are these devices readily adaptable to both field and laboratory use.

SUMMARY OF THE INVENTION

The present invention relates to an apparatus for measuring scalar irradiance. The devices defined by this invention measures the intensity of light flux incident upon a sphere from a $4\pi$ solid angle about the center of the sphere.

The apparatus disclosed in this invention comprises a solid spherical light collector whereby light which strikes the outside of the sphere becomes increasingly diffused as it penetrates the sphere. A light conductor transmits a proportion of the light within the sphere to a spectral shaping device. The spectral shaping device is a series of lenses and filters which partially collimate the diverging light exiting the light conductor and adjusts the spectral characteristics of the light to compensate for anomolies in the apparatus and for the denied unit of light measurement. An electronic conditioning device with a light detector detects the light intensity and converts it into an electronic signal, then adjusts and manipulates the electronic signal for its display on an appropriate light intensity readout device.

An object of the present invention is to provide an apparatus for measuring scalar irradiance. A further object of the present invention is to provide an apparatus for measuring scalar irradiance in units of photon flux or energy flux in either an instantaneous or integrated mode. A further object of this device is to provide a device which can be adapted to provide a substantially spherical response to both a $2\pi$ and $4\pi$ incident light flux.

An object of the present invention is to provide an apparatus for measuring scalar irradiance which has the ability to interchange frequency or wavelength spectral shaping filter whereby the apparatus is optically tuned to the units of measure. A further object of the present invention is to provide an apparatus for measuring scalar irradiance whereby the light collecting device is remote relative to the light conversion means. A further object of the present invention is to provide an apparatus for measuring scalar irradiance which includes an electrical signal conditioning device which may be remote to the detector and which may be remote to the readout device.

BRIEF DESCRIPTION OF THE DRAWINGS

This invention will be more fully understood by the following description and the attached drawing, in which:

FIG. 1 is a view of the hand-held irradiance meter which is shown in broken section to expose the internal components.

FIG. 2 shows the spectral characteristics for various alternatives of Quantum Response to Wavelength.

FIG. 4 is a view of the complete meter with common optical and electrical housing.

Figure 3:
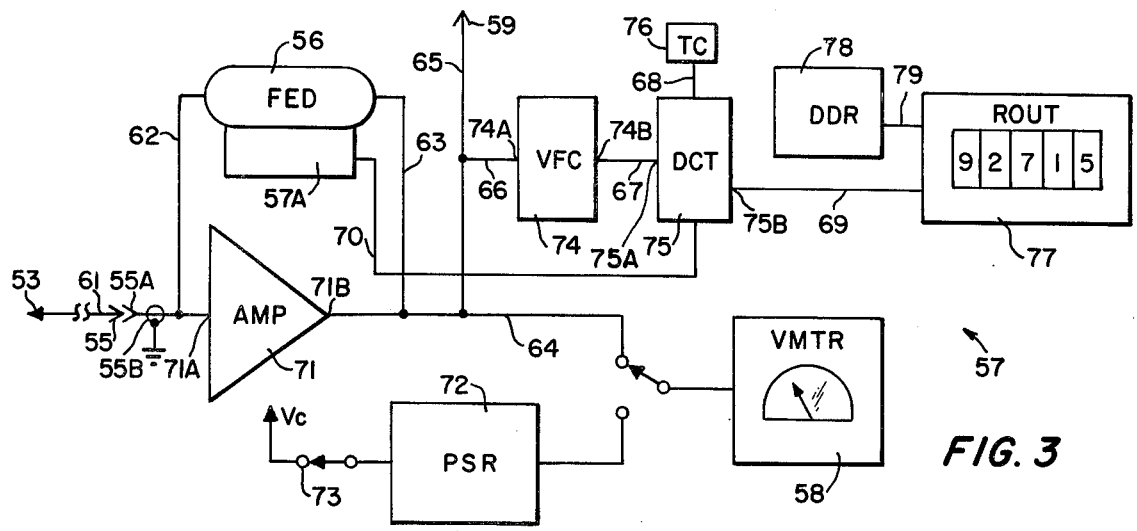
FIG. 3 is a schematic representation of the electrical conditioning circuitry.

DESCRIPTION OF THE PREFERRED EMBODIMENT
Primary Embodiment

FIG. 1 shows a preferred embodiment of the scalar irradiance meter which is adapted to hand-held operations in a laboratory environment and can be further adapted for use in an underwater environment. Specifically, this embodiment called the first meter, shown generally as 11, includes a solid spherical collector 12, a light conductor 13, an optical housing 14 which encloses the spectral shaping device, an electronic housing 15 which encloses the electronic conditioning device, and readout devices 16.

The solid spherical collector 12 increasingly diffuses light which strikes the spherical collector 12 as it penetrates the spherical collector 12. Any diffusing material such as styrofoam would be appropriate; however, teflon is preferred due to its mechanical properties which make it easily machinable. While a wide range of spherical dimensions are acceptable a collector 12 with a spherical diameter of between 0.50 inches and 1.50 inches is preferred.

The light conductor 13 may be fabricated out of any light transparent material. Examples include: glass rods, quartz rods, glass fiber bundles, and plexiglass rods. The embodiment shown in FIG. 1 employs a glass fiber bundle 13 as provided by Americal Optical and designated as ULGM-2-12. Both the forward ends 31 and the rear ends 32 of the light conductor 13 are dipped in a suitable epoxy and inserted into respective forward end cap 33 and rear end cap 34. The outer ends of each end cap 33 and 34 are ground flat and smooth for best light transmitting results.

The solid spherical collector 12 is prepared with a receiving hole 21 into which the forward end cap 33 is inserted. The interior diameter of receiving hole 21 is slightly smaller than the exterior diameter of forward end cap 33, whereby the insertion causes slight deformation of the hole 21. The subsequent relaxation of the deformed teflon around the hole 21, securely retains the inserted forward end cap 33.

The preferred glass fiber bundles light conductor 13 is further provided with a protective flexibly coiled steel shield 35 and a protective forward seal cap 37. The rear end cap 34 of the rear end 32 of the conductor 13 is inserted into a rear seal cap 38 mounted to the upper end plate 41 of the optical housing 14.

The optical housing 14 is a cylindrical chamber adapted to enclose the spectral shaping device, shown generally as 42. The spectral shaping device 42 includes a series of collimating convex lenses 43 and subtractive color or spectrum filters 44. The nature of the lenses 43 and their placement is designed to focus the light exiting the conductor 13 on a light detector 51 mounted to the lower end plate 36 of the optical housing 14. The spectrum filters 44 are designed to adjustments in the wavelength or frequency characteristics of the light meter 11, whereby direct readouts of the light intensity in preselected units, such as numbers of photons or amount of energy, is possible.

Specifically, the spectrum filters 44 are selected to adjust the frequency response of light meter 11 such as that shown in FIG. 2. FIG. 2 depicts the relative quantum response along the vertical axis and the wavelength of the incident light along the horizontal axis. The horizontal wavelength scale shows a range of approximately 350 to 700 nanometers, the generally accepted range of useful light in photosynthetically significant experiments. The frequency spectrum indicated at A depicts an ideal quantum response for an equal number of photons for each frequency. The frequency spectrum indicated at B depicts the energy response for an equal amount of energy at each frequency. The frequency spectrum indicated at C depicts the characteristic response of the human eye. The frequency spectrum indicated at D depicts the shape of an ideal narrow wavelength meter.

By appropriate selection of the spectrum filters 44, the characteristic response of the light meter 11 can be adapted to any of those shown in FIG. 2. Other spectrum response characteristics can be established where appropriate.

Referring back to FIG. 1, the light detector 51 is a conventional photo cell which converts light energy into electrical energy; whereby the greater the intensity of light striking the face 51C of the detector 51 the greater the current generated at terminals 51A and 51B. The detector 51 and the spectral shaping device 42 are adjustably attached through a spring and screw device 45 in the secured lower end plate 36 such that the collimated light is focused directly on the face 51C of the detector 51.

The terminals 51A and 51B are connected to voltage amplifiers 71 (FIG. 3) within the electronic housing 15. While the electronic housing 15 may be located within the same enclosure as the optical housing 14 the embodiment described herein shows a light meter 11 which has the electronic housing 15 located remote relative to the optical housing 14.

The detector 15 is connected to the amplifier 71 (FIG. 3) through conventional connection devices as shown in FIG. 1, namely an input pair of BNC connectors 53 mounted on the optical housing 14, a co-axial cable 54 and an output pair of BNC connectors 55 mounted on the electronic housing 15.

The electronic conditioning circuitry, shown generally as 57, is schematically presented in FIG. 3. In FIG. 3 the detector signal is provided as the center contact 55A of connector 55 and is connected to amplifier 71 (AMP) through line 61, the other contact 55B being chassis grounded. An amplifier suitable for this application is the Intersil ICH 8500A configured as a current-to-voltage converter. The current-to-voltage ratio is determined by the feedback network 56 connected between the amplifier input 71A by line 62 and the amplifier output 71B by line 63. The feedback network 56 (FED) includes an adjustable intensity range switch 57A whereby the current-to-voltage ratio is adjusted to match significant fluctuations in the intensity of the light field. Conventional range changing and high frequency roll-off procedures are used in the feedback network 56.

The amplifier output 71B is further connected via line 64 to a panel voltage meter 58 (VMTR) for displaying the instantaneous light field intensity. The amplifier output 71B is also connected to output jack 59 via line 65 to drive a variety of voltage sensitive recording devices 16 (FIG. 1).

The amplifier output 71B is further connected via line 66 to the voltage input terminal 74A of a voltage-to-frequency converter 74 (VFC). A nominal 0 to 5 volt D.C. source is proportionally converted to a 0 to 1 KH frequency. The frequency output terminal 74B of the voltage-to-frequency converter is conventionally connected, via line 67, to the serial input 75A of a series of two 4-digit decade counters 75 (DCT), such as National Semiconductor MM 74 C926N.

The decade counter 75 accumulates a count of the frequency over a specified time. The larger the light intensity, the greater the voltage, the higher the frequency, and the larger the count. The range switch 57A is also connected via line 70 to the decade counter 75 to provide an accumulator rate which corresponds to the range switch 57A setting.

A timing circuit 76 (TC) is connected to the decade counter 75 via line 68 which enables the counter to accumulate a count for a fixed predetermined period of time. Manual control of the timing circuit 76 enables selection of short duration, long duration or continuous count accumulations.

The digital output 75B of the decade counter 75 is conventionally connected via lines 69 to an 8-digit digital readout display 77 (ROUT). A satisfactory display drive is a 5-digit, 7-segment, light-emitting diode display. Digital drivers 78 (DDR) are connected, via lines 79 to the digital readout display 77 to supply the required display drive current. The drivers 78 are manually controlled, whereby the readout display 77 may be turned on and off to conserve the power source 72 (PSR).

Power to the electronic circuitry is conventionally provided by power source batteries 72. Power switch 73 enables and disables the power source 72.

In the embodiment shown in FIG. 1, the power source 72 is a stack of rechargeable nickel-cadmium batteries with output arranged to deliver the necessary power, such as +8.25 Vdc, −7.5 Vdc, +5.00 Vdc and 0.0 Vdc. The power source 72 may be alternatively provided as a conventional power supply operating on a standard 110 ac current.

Referring back to FIG. 1, the voltage sensitive recording device 16 may consist of any recording device responsive to a varying input voltage signal. For example, a digital voltage level recorder and strip chart recorder. These are suggested as examples only and not intended to limit either the scope or essence of this invention.

A wide variety of electronic conditioning circuitry can be developed and the examples presented herein are presented for demonstration purposes only. The particular embodiment presented is not intended to limit or restrict the essence of this invention. Alternative electronic circuitry, which can be employed, to provide relevant information on the measurement of light intensity, includes maximum or minimum threshold counting devices, average intensity recorders, and integrated intensity recording devices.

In operation the solid spherical collector 12 presents substantially a spherical cross-section to incident light from all directions. Additionally, the placement of the light detector 51 apart from the collector 12 allows the easily adjustable, removable and replaceable spectral shaping device 42. Significantly, the light conductor 13 provides the freedom to locate the collector 12 apart from the detector 51, thereby preventing disruption of the light environment.

Including the electronic conditioning circuitry 57, the instantaneous light intensity voltage meter 58, and the integrated light intensity digital display 77 within the light meter 11 produces a light metering apparatus which has never been seen in the prior art.

In practice, the light meter 11 is turned on via power switch 73, the timing circuit in 76 is set, and the display drivers 78 are turned on enabling the digital display 77. Any attached recording devices 16 are similarly enabled. The solid spherical collector 12 of the light meter 11 is placed within the light field in question. The light penetrating the collector 12 is diffused, such that the light in the vicinity of the center of the collector 12 has undergone sufficient scattering so as to have lost its directional nature. A proportional quantity of incident light enters the light conductor 13 through its polished forward end 31. The light is then channeled through the conductor 13 to the spectral shaping device 42. There the light is appropriately filtered and focused onto the detector 51.

The electrical signal generated by the detector 51 is transmitted to the electronic circuitry 57. The electrical signal is appropriately conditioned and presented for readout on the voltage meter 58. The electrical signal is further conditioned whereby an accumulated count is displayed on the digital display 77. The conditioned voltage is also provided at the output jack 59 for use by recording devices 16. The displayed readings are calibrated and the intensity of the light field thus determined.

First Alternate Embodiment

FIG. 4 shows the First Alternative embodiment of the light meter, designated hereinafter as the complete meter and generally referred to as 111. The complete meter 111 is designed to be completely self-contained and to operate in an underwater environment. The complete meter 111 is functionally and operationally similar to the light meter 11 shown in FIG. 1.

The complete meter 111 includes a solid spherical collector 112, a light conductor 113, an optical housing 114, an electronic housing 115, and optional recording devices (not shown).

The solid spherical collector 112 is substantially the same as the collector 12 described above (see FIG. 1). However, the light conductor 113 is made out of an alternative material, solid clad quartz rod. The forward end 131 of the quartz conductor 113 is polished and inserted into a hole 121 within the collector 113. The rear end 132 of the quartz conductor is inserted through a watertight seal 134 in the forward end 141 of the optical housing 114.

The optical housing 114 and the electronic housing 115, in this embodiment, are fabricated as a single integrated watertight enclosure 117. However, for purposes of comparison, this discussion will refer to that portion of the watertight enclosure 117 which houses the spectral shaping device 142 as the optical housing 114, and that portion which houses the electronic conditioning circuitry 157 as the electronic housing 115.

Within the electronic housing 115 an electronic circuit 157, similar to that described above and shown in FIG. 3, is included. In the complete meter 111, however, a watertight power switch 173, a watertight voltage meter 158, and a watertight digital display 177 are provided. The manner in which these devices are made watertight is not considered substantive to this invention. A watertight output jack 159 is also provided so that the remote light recorded measurements taken with the complete meter 111.

The spectral shaping device 142 of the complete meter 111 is analogous to spectral shaping device 42 within the light meter 11; however, the electronic conditioning circuitry 157 is adapted to fit within the complete meter 111. The electronic conditioning circuitry 157, which is schematically the same as the electronic conditioning circuitry 57 of the light meter 11, shown in FIG. 3, is mounted on a printed circuit card 145 which is adapted to fit within the electronic housing 115. Similarly the power source 172 and the power switch 173, voltage meter 158, and digital display 177 are adapted to fit within the electronic housing 115.

The operation of the complete meter 111 is analogous to that of the light meter 11. The collecting sphere 112 is placed within the light field in question and the complete meter 111 turned on. A proportional amount of light penetrating the spherical collector 112 is transmitted through the light conductor 113 to the spectral shaping device 142, where the light is filtered and focused on the detector 151. The electronic conditioning circuit 157 then conditions the electrical signal produced by the detector 151 for display. The instantaneous light intensity can be determined by reading the voltage level meter 158, the integrated light intensity can be determined by reading the digital display 177.

Second Alternate Embodiment

Figure 5:
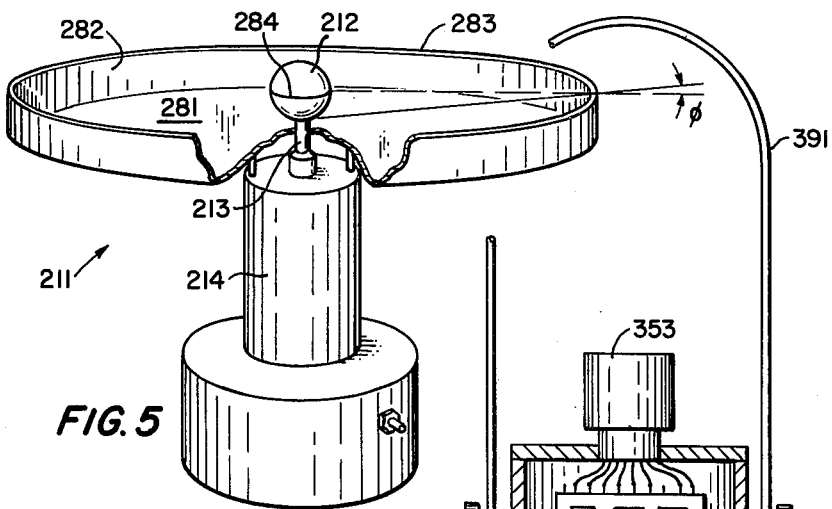
FIG. 5 shows the hemispherical meter with a broken out section to emphasize the orientation of the hemispherical shield.

The second alternate embodiment of the invention, a hemispherical meter, shown in FIG. 5 and designated generally as 211, is designed to measure the scalar irradiance from a restricted continuous $2\pi$ hemisphere. The hemispherical meter, 211, consists of essentially the same basic components as included in the light meter 11; namely, a solid spherical collector 212, a light conductor 213, an optical housing 214, a remote electronic housing (not shown), and optional recording devices (not shown). Significantly, the hemispherical meter 211 also includes a hemispherical shield 218.

Because the structure of the hemispherical meter 212 is functionally and operationally analogous to the structure of the light meter 11, shown in FIG. 1 and described above, only the function and operation of the additional structure of the hemispherical meter 211 is presented. The purpose of the hemispherical meter 211 is to measure the scalar irradiance incident on a point from a continuous $2\pi$ hemisphere. The response of the hemispherical meter 211 resulting from a light source directly in front of the meter is substantially the same as its response of the same light source just above the horizon and provides no response just below the horizon.

The solid spherical collector 212 of the hemispherical meter 211 is centered above a hemispherical shield 218. The shield 218 is a flat circular plate 281 with a nominally one inch high perpendicular lip 282 circumventing the plate 281.

The solid spherical collector 212 is mounted on the light conductor 213 in the center of the circular plate 218. The optical housing 214 is mounted behind the circular plate 218 with the electrical housing being remotely located.

The orientation of the upper edge 283 of the lip 282 relative to the spherical collector 212 is such that the equatorial circumference 284 of the spherical collector 212 is substantially within the same plane as that plane described by the upper edge 283 of the lip 282. This configuration enables substantially the entire continuous $2\pi$ hemisphere to "see" a spherical collector. Only a slight angle $\phi$ above the horizon is unable to see a complete spherical collector; the tangent of the angle $\phi$ being given as the ratio of the diameter of the spherical collector to the diameter of the circular plate. For a small angle $\phi$, the diameter of the circular plate 281 must be large relative to the diameter of the spherical collector 212.

The circular plate 281 and lip 282 are coated with a light absorptive material which prevents reflections from the plate 281 to the collector 212. Such reflections would significantly reduce the accuracy of the hemispherical meter 211.

The hemispherical meter 211 is typically operated in the vertical position thereby measuring the $2\pi$ scalar irradiance from the sun and sky above. In all other aspects the application of and operation of the hemispherical meter 211 is similar to the light meter 11.

Third Alternate Embodiment

Figure 6:
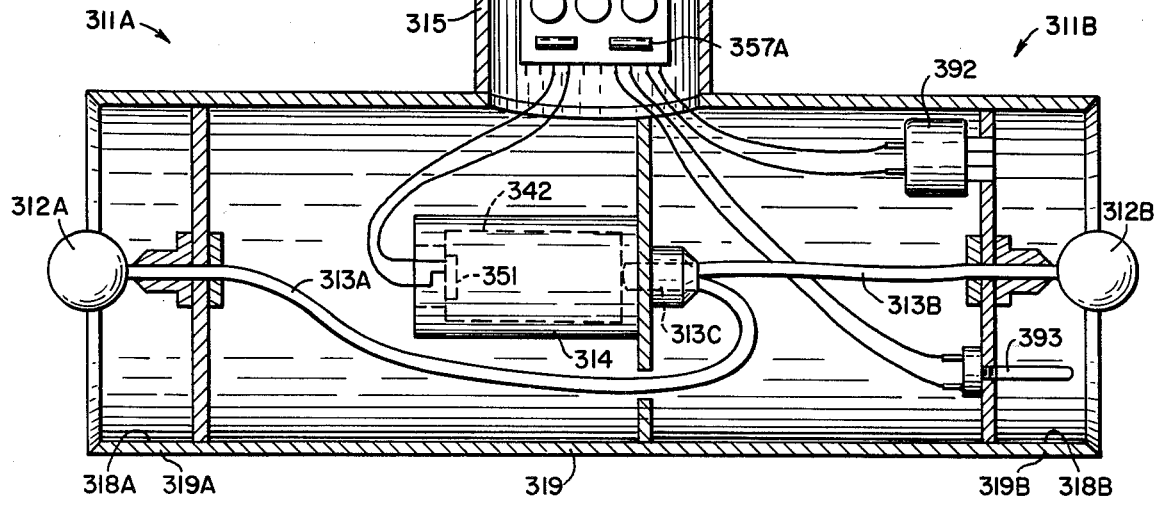
FIG. 6 is a view of the dual hemispherical meter in section to show the orientation of internal components.

The third alternate embodiment is a dual hemispherical meter, shown generally as 311 in FIG. 6. The dual meter 311 is a watertight light meter designed to measure light intensities from opposite horizontal hemispheres (that hemisphere whereby the normal to the plane of its horizon is horizontal). While the components of the dual meter 311 are analogous to the light meter 11 shown in FIG. 1, the dual meter includes two hemispherical type meters, similar to that of the hemispherical meter 211 shown in FIG. 4.

The dual meter 311 consists of two opposed solid spherical collectors 312A and 312B, respectively, in the center of corresponding hemispherical shields 318A and 318B, respectively. The operation of each of the separate horizontal hemispherical detectors, shown generally as 311A and 311B, respectively, is analogous to that of the hemispherical meter 211. The separate horizontal hemispherical detectors, 311A and 311B, respectively, are located in opposite ends 319A and 319B, respectively, of a cylindrical chamber 319.

The light conductors, 313A and 313B, respectively, transmit proportional amounts of light incident upon the corresponding collectors 312A and 312B, respectively, to the optical housing 314 located within the chambers 319. At the optical housing 314 the separate light conductors 313A and 313B are combined into a single conductor 313C which transmits the light to a single enclosed spectral shaping device 342. An alternate embodiment of the dual meter 311 may provide for separate metering apparatuses for both the separate horizontal hemispherical detectors 311A and 311B, respectively.

The spectral shaping device 342 is similar to that of the light meter 11 shown in FIG. 1. Within the spectral shaping device 342 the light is appropriately filtered and focused onto a single detector 351. The detector 351 produces an electrical signal which is transmitted to the electronic conditioning circuit 357 within the electrical housing 315.

The electronic conditioning circuit 357 of the dual meter 311 has been divided into two portions, a pre-amplifier circuit 357A and a readout circuit (not shown). The purpose for this separation is the result of the typical use of dual meter 311. Generally, the dual meter 311 is lowered to some depth in the ocean requiring the display device to be located remotely, on shipboard, and requiring the electrical signal produced by the detector 351 to be strengthened by a pre-amplifier so that it can be effectively transmitted to the ship.

The pre-amplifier 357A is of conventional design, as is the remotely located (shipboard) readout circuit. The power required to operate the pre-amplifier circuit 357A is provided by either batteries housed within the chamber 319 or by shipboard power provided through a support and data cable (not shown).

The dual meter 311 further includes depth and temperature sensors, 392 and 393, respectively. The depth sensor 392 and temperature sensor 393 are provided with conventional electronic circuitry to enable the display of the corresponding measurements.

Electronic signal produced by light detector 351, and the signal produced by the depth sensor 392, and temperature sensor 393 are pre-amplified and transmitted from the chamber 319 to the remote (shipboard) readout circuit and corresponding display devices, over a multiconductor support and data cable. The multi-conductor support and data cable provides the power for the pre-amplifier circuit 357A and serves as a support cable for the chamber 319. The support cable (not shown) is attached to a bridle attachment 391, and is connected to the pre-amplifier circuitry 357A and sensor circuitry via connector 353.

The variety of alternate methods or techniques for producing electronic signals to be transmitted to the remote display devices and for transmitting those electronic signals are considered within the scope of this invention.

It is to be understood that the description of my invention presented herein is done to fully comply with the requirements of 35 U.S.C. 112 and is not included to limit or restrict the essence of this invention. Variant forms of the apparatus described herein, which employs spherical collectors, light conductor, spectral shaping, electronic conditioning and readout devices for instantaneous and integrated light intensity measurements, could easily be developed. Such variant forms are considered within the scope of this invention.

What is claimed is:

1. An apparatus for measuring the incident flux of scalar irradiance over a $4\pi$ solid angle which comprises:
    (a) means for collecting omnidirectional scalar irradiance, said collecting means comprising a solid, spherical structure;
    (b) means for converting the incident flux of said scalar irradiance into an electrical signal;
    (c) means for adjusting the spectral response of the apparatus to obtain a spectral response that will allow said apparatus to measure scalar irradiance in predetermined radiometric or photometric units;
    (d) means for conducting said scalar irradiance from substantially the geometrical center of said collecting means to said adjusting means;
    (e) means for conditioning said electrical signal for its display; and
    (f) means for displaying said electrical signal.

2. The apparatus of claim 1 wherein said collecting means comprises a solid teflon sphere whose radius is 0.75 inches.

3. The apparatus of claim 1 wherein said conditioning means comprises:
    (a) an amplifier connected to said converting means having a feedback network connected between the input of the amplifier to form a current-to-voltage converter such that the output voltage is proportional to the input current;
    (b) a voltage meter connected to the output of the amplifier to measure the magnitude of the amplified voltage;
    (c) a voltage-to-frequency converter connected to the output of the amplifier to produce an electrical signal having a frequency proportional to the amplified voltage; and
    (d) a counter connected to the output of the voltage-to-frequency converter, whereby the number of cycles of the voltage-to-frequency converter are accumulated and displayed on a readout display.

4. The apparatus of claim 1 wherein said apparatus is encased in a water tight enclosure.

5. The apparatus of claim 1 wherein said conducting means is fabricated out of light conductive material selected from the group consisting of glass rods, quartz rods, glass fiber bundles, and plexiglass rods.

6. The apparatus of claim 1 wherein said collecting means comprises a solid teflon sphere and a hemispherical shield having a circular plate with a perpendicular circumferential lip, said plate being mounted behind said sphere so that the equitorial circumference of said sphere is substantially within the plane defined by the outer edge of said lip, whereby said collecting means detects said scalar irradiance from a continuous $2\pi$ hemisphere.

7. The apparatus of claim 6 wherein said apparatus further comprises:
    (a) opposed, solid, teflon spheres and opposed hemispherical shields for collecting scalar irradiance from the opposed continuous $2\pi$ hemispheres; and
    (b) opposed means for conducting the scalar irradiance from substantially the geometrical center of said collecting means to said adjusting means.

8. The apparatus of claim 1 wherein said collecting means comprises a solid teflon sphere mounted whereby said collecting means detects scalar irradiance from a substantially continuous $4\pi$ angle.

9. The apparatus of claim 1 which further comprises a means for adjusting the spectral response of said converting means, said adjusting means comprising a plurality of collimating convex lenses and spectrum filters.

10. The apparatus of claim 1 which further comprises a means for detecting the depth of said apparatus, and a means for detecting the ambient temperature of said apparatus.

11. The apparatus of claim 1 which further comprises a means for recording said electrical characteristics.

* * * * *